United States Patent
Oe et al.

(10) Patent No.: US 9,348,516 B2
(45) Date of Patent: May 24, 2016

(54) STORAGE CONTROLLER, STORAGE SYSTEM, METHOD OF CONTROLLING STORAGE CONTROLLER, AND COMPUTER-READABLE STORAGE MEDIUM HAVING STORAGE CONTROL PROGRAM STORED THEREIN

(71) Applicant: FUJITSU LIMITED, Kawasaki-shi, Kanagawa (JP)

(72) Inventors: Kazuichi Oe, Yokohama (JP); Motoyuki Kawaba, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 285 days.

(21) Appl. No.: 14/088,485

(22) Filed: Nov. 25, 2013

(65) Prior Publication Data
US 2014/0244959 A1  Aug. 28, 2014

(30) Foreign Application Priority Data
Feb. 25, 2013  (JP) .................. 2013-034831

(51) Int. Cl.
*G06F 12/02*  (2006.01)
*G06F 3/06*  (2006.01)

(52) U.S. Cl.
CPC ............ *G06F 3/061* (2013.01); *G06F 3/0649* (2013.01); *G06F 3/0685* (2013.01)

(58) Field of Classification Search
CPC ...... G06F 3/061; G06F 3/0685; G06F 3/0649
See application file for complete search history.

(56) References Cited

U.S. PATENT DOCUMENTS

| | | | | |
|---|---|---|---|---|
| 6,324,620 | B1* | 11/2001 | Christenson | G06F 3/061 710/74 |
| 6,941,432 | B2* | 9/2005 | Ronstrom | G06F 12/122 711/117 |
| 8,688,904 | B1* | 4/2014 | Ari | G06F 3/0611 711/100 |
| 2004/0260768 | A1* | 12/2004 | Mizuno | G06F 9/52 709/203 |
| 2010/0131733 | A1 | 5/2010 | Jess | |
| 2010/0274826 | A1 | 10/2010 | Takata et al. | |
| 2011/0185120 | A1 | 7/2011 | Jess | |
| 2011/0246745 | A1 | 10/2011 | Fukui et al. | |
| 2012/0246403 | A1* | 9/2012 | McHale | G06F 3/0604 711/114 |
| 2013/0151774 | A1* | 6/2013 | Bolik | G06F 3/0604 711/118 |

FOREIGN PATENT DOCUMENTS

| | | |
|---|---|---|
| JP | 2010-257094 | 11/2010 |
| JP | 2011-154669 | 8/2011 |
| JP | 2011-216052 | 10/2011 |
| JP | 2012-509538 | 4/2012 |

\* cited by examiner

*Primary Examiner* — Hiep Nguyen
(74) *Attorney, Agent, or Firm* — Fujitsu Patent Center

(57) ABSTRACT

A storage system includes: a first storage unit; a second storage unit that has an access speed higher than an access speed of the first storage unit; and a storage controller that collects load information about respective loads in a plurality of areas in the first storage unit, selects a candidate area in the first storage unit which is to be migrated, based on the collected load information, and migrates data in the selected candidate area, to the second storage unit.

13 Claims, 14 Drawing Sheets

FIG. 3

| SSD OFFSET | HDD OFFSET | STATUS |
|---|---|---|
| 0 | 268435456 | ALLOCATED |
| 2097152 | 306184192 | Moving(HDD->SSD) |
| 4194304 | 505413632 | Moving(SSD->HDD) |
| 6291456 | NULL | FREE |
| ⋮ | ⋮ | ⋮ |

221 222 223 22

STORAGE CONTROLLER, STORAGE SYSTEM, METHOD OF CONTROLLING STORAGE CONTROLLER, AND COMPUTER-READABLE STORAGE MEDIUM HAVING STORAGE CONTROL PROGRAM STORED THEREIN

CROSS-REFERENCE TO RELATED APPLICATION

This application is based upon and claims the benefit of priority of the prior Japanese Patent Application No. 2013-034831, filed on Feb. 25, 2013, the entire contents of which are incorporated herein by reference.

FIELD

The present disclosure relates to a storage controller, storage system, method of controlling a storage controller, and a computer-readable storage medium having a storage control program stored therein.

BACKGROUND

For example, load analyses of tiered storage systems including hard disk drives (HDDs) and solid state drives (SSDs) have revealed that nomadic work load spikes emerge in some of the tiered storage systems.

As used herein, the term "spike" refers to the situation where work loads (also known as loads) emerge intensively on a limited area in a storage. The term "nomadic work load spike" refers to a situation where such spikes occurs intensively for a relatively shorter time (e.g., about one to 10 minutes), and then spikes emerge in a different location (offset).

An example of nomadic work load spikes is illustrated in FIG. 13.

In FIG. 13, the horizontal axis represents offsets in the volume in a storage, while the vertical axis represents elapsed time.

The black bars in FIG. 13 represent 1-GB segments where work loads inventively emerge in the storage volume. Here, the term "segment" refers to fixed-size area in the storage volume. For example, a 1-GB segment is 1-GB area in the volume in the storage.

At the time of the arrow A in FIG. 13, ten or less segments are hit by spikes simultaneously. The arrows B and C in FIG. 13 indicate segments where work loads last.

For eliminating such work loads, in addition to HDDs, tiered storage systems are provided with an SSD as a cache, for achieving both performance improvement and cost efficiency. The scheme where an SSD is employed as a cache is referred to as the SSD cache scheme.

Examples of SSD caches include Facebook flush caches and Fusion Direct caches.

Unfortunately, such an SSD cache scheme employs the writeback of the cache. Hence, the SSD cache scheme may cause a problem upon migrating nomadic work load spikes with higher write ratios.

Specifically, once all SSD cache blocks have been consumed, for allocating a new spike and cache block, some cache blocks need to be cleaned. For nomadic work load spikes with higher write ratios, a significant amount of writeback to HDDs occurs.

Typical SSD cache blocks have smaller sizes, e.g., 4 kilobytes (KB), and hence a writeback causes a random access to the HDD, which leads to a significant delay.

Additionally, in the writeback cache scheme, once all cache areas are exhausted, a writeback of a dirty block (a block in the SSD the content, data in which does not match the content in the corresponding block in the HDD) occurs frequently. While nomadic work load spikes with higher write ratios are executed, writeback of dirty blocks frequently occurs, which consumes significant areas that can be used by the user.

For the reasons set forth above, applying an cache SDD to work loads experiencing nomadic work load spikes with higher write ratios is often not so effective as expected.

SUMMARY

Hence, a storage controller that controls a first storage unit and a second storage unit that has an access speed higher than an access speed of the first storage unit, the storage controller comprising: a collector that collects load information about respective loads in a plurality of areas in the first storage unit; a selector that selects a candidate area in the first storage unit which is to be migrated, based on the load information collected by the collector; and a migrator that migrates data in the selected candidate area, to the second storage unit.

Additionally, a storage system includes: a first storage unit; a second storage unit that has an access speed higher than an access speed of the first storage unit; and a storage controller that collects load information about respective loads in a plurality of areas in the first storage unit, selects a candidate area in the first storage unit which is to be migrated, based on the collected load information, and migrates data in the selected candidate area, to the second storage unit.

Furthermore, a method of controlling a storage controller that controls a first storage unit and a second storage unit that has an access speed higher than an access speed of the first storage unit, the method includes, by the storage controller: collecting load information about respective loads in a plurality of areas in the first storage unit; selecting a candidate area in the first storage unit which is to be migrated, based on the collected load information; and migrating data in the selected candidate area, to the second storage unit.

Furthermore, a computer readable recording medium having stored therein, a control program for controlling a storage controller that controls a first storage unit and a second storage unit that has an access speed higher than an access speed of the first storage unit, the control program causing the storage controller to: collect load information about respective loads in a plurality of areas in the first storage unit; select a candidate area in the first storage unit which is to be migrated, based on the collected load information; and migrate data in the selected candidate area, to the second storage unit.

The object and advantages of the invention will be realized and attained by means of the elements and combinations particularly pointed out in the claims.

It is to be understood that both the foregoing general description and the following detailed description are exemplary and explanatory only and are not restrictive of the invention.

BRIEF DESCRIPTION OF DRAWINGS

FIG. 3 is a diagram illustrating an example of a tiering table used in the tiered storage system as one example of an embodiment;

DESCRIPTION OF EMBODIMENTS

Hereunder is a description of an embodiment in accordance with the disclosed technique with reference to the drawings.

(A) Configuration

Hereinafter, a configuration of a tiering storage system (storage system) 1 as an example of an embodiment will be described with reference to FIGS. 1 to 4.

Figure 1:
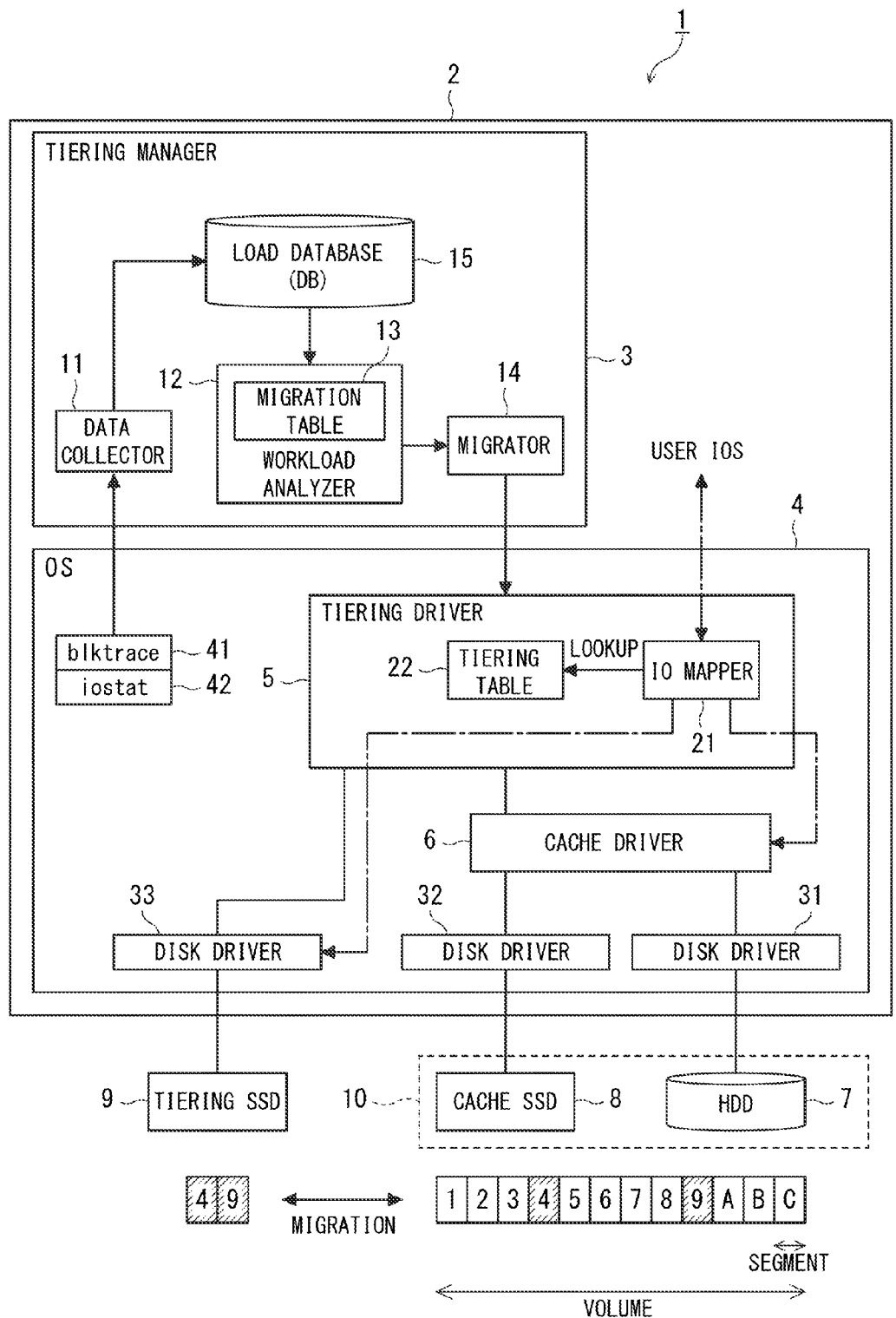
FIG. 1 is a schematic diagram illustrating a system configuration of a tiering storage system as an example of an embodiment.
Figure 2:
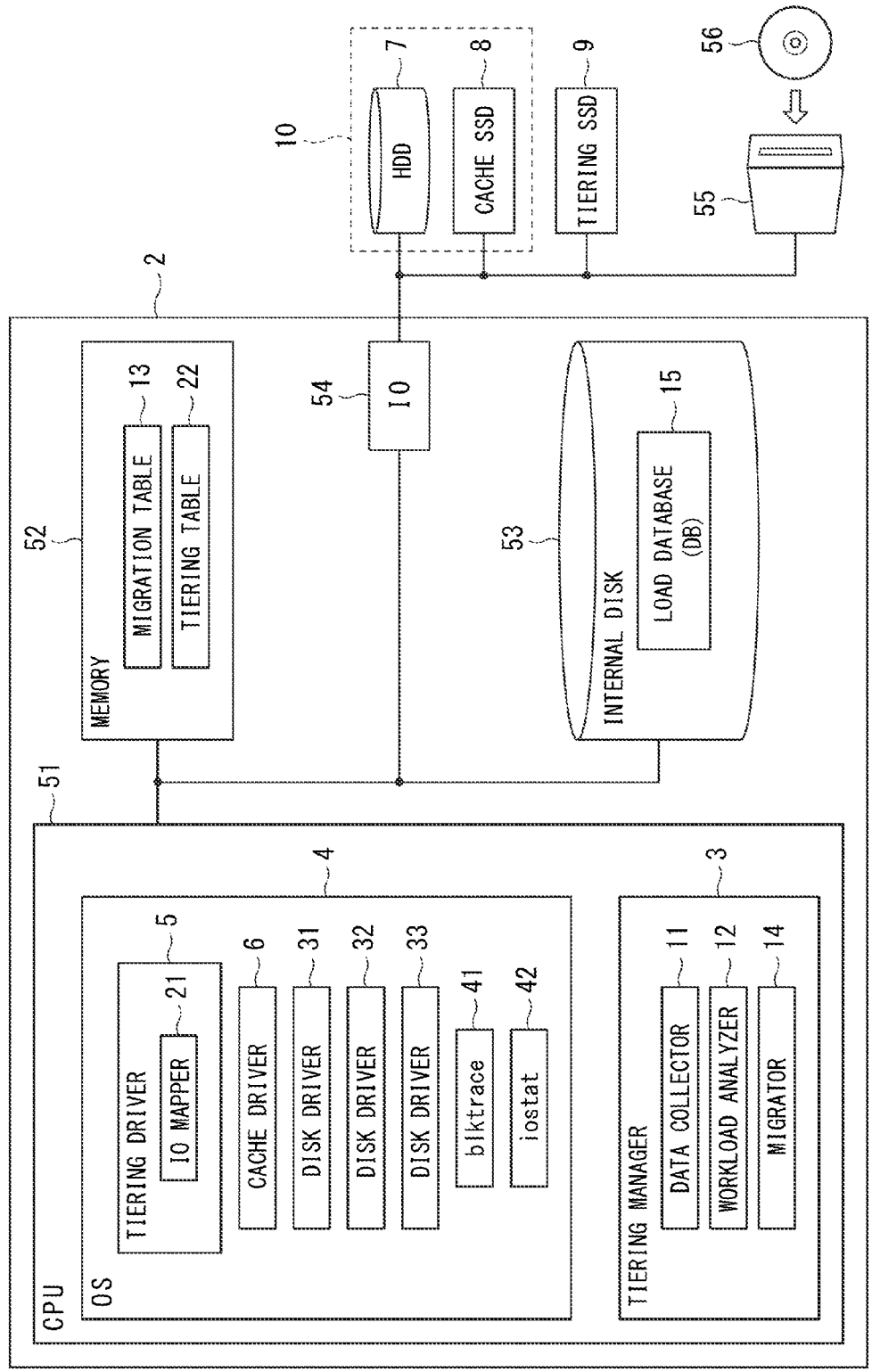
FIG. 2 is a schematic diagram illustrating functional and hardware configurations of the tiering storage system as an example of an embodiment.

FIG. 1 is a schematic diagram illustrating a system configuration of the tiering storage system as an example of an embodiment. FIG. 2 is a schematic diagram illustrating functional and hardware configurations of the tiering storage system 1 as an example of an embodiment.

The tiered storage system 1 includes an information processing apparatus 2, a HDD (first storage unit) 7, a cache SSD (third storage unit) 8, and a tiering SSD (second storage unit) 9.

The information processing apparatus 2 is a computer having a server function, for example, and sends and receives a wide variety of types of data, such as SCSI commands and responses, from and to the HDD 7 and the cache SSD 8, which will be described later, using a storage connection protocol. The information processing apparatus 2 writes and reads data to and from storage areas provided by the HDD 7 and the cache SSD 8, by sending disk access commands, such as read and write commands, to the HDD 7 and the cache SSD 8.

The HDD 7 is a storage drive including disks having magnetic materials applied thereon, as a recording medium, wherein, by moving a magnetic head, information is read and written from and to the disks rotating at a high speed.

The cache SSD 8 is a storage drive including a semiconductor memory as a recording medium, and is also referred to as a silicon disk drive or a semiconductor disk drive. Generally, the cache SSD 8 enables faster random accesses than those of the HDD 7, since the cache SSD 8 does not take head seek time for moving the magnetic head, unlike the HDD 7. The cache SSD 8 is more expensive than the HDD 7 since it has a semiconductor memory device.

In the present embodiment, the HDD 7 and the cache SSD 8 behave as a single disk. Specifically, pieces of data in the HDD 7, which are frequently accessed by the tiered storage apparatus 1, are placed in the cache SSD 8 having a higher access speed. In other words, the cache SSD 8 is used as a cache of the HDD 7. For this reason, thereinafter, the HDD 7 and the cache SSD 8 are collectively referred to as a flush cache 10, or simply as a cache 10. Alternatively, the HDD 7 and the cache SSD 8 can be reckoned as a single HDD 10, and may be referred to as a HDD 10.

Note that techniques for using the cache SSD 8 as a cache of the HDD 7 are well known in the art, and thus the descriptions therefor are omitted there.

The tiering SSD 9 is a storage drive including a semiconductor memory as a recording medium, and is also referred to as a silicon disk drive or a semiconductor disk drive. Generally, the tiering SSD 9 enables faster random accesses than those of the HDD 7, since the tiering SSD 9 does not take head seek time for moving the magnetic head, unlike the HDD 7. The tiering SSD 9 is more expensive than the HDD 7 since it has a semiconductor memory device.

As depicted in FIG. 2, the information processing apparatus 2 includes a central processing unit (CPU) 51, a memory 52, an internal disk 53, an input/output (I/O) interface 54, and a media reader 55, for example.

The CPU 51 runs an operating system (OS) 4, which is system software for providing basic functions of the information processing apparatus 2. The CPU 51 executes various types of processing by running programs stored in the memory 52.

The memory 52 stores various kinds of programs and data executed by the CPU 51, and data generated during the operation of the CPU 51. The memory 52 also functions as a storing unit that stores a migration table 13 and a tiering table 22, which will be described later. The memory 52 may be any of a wide variety of known memory devices, such as a random access memory, a read only memory (ROM), a non-volatile memory, and a volatile memory. Further, the memory 52 may include multiple types of memory devices.

The internal disk 53 is a disk drive providing an storage area internal to the information processing apparatus 2, and stores the OS 4 and a wide variety of programs to be executed by the information processing apparatus 2, for example. The internal disk 53 is a HDD, for example. The internal disk 53 also functions as a storage unit that stores a load database (DB, dataset) 15, which will be described later.

The I/O interface 54 is an adaptor that connects the information processing apparatus 2, the HDD 7, the cache SSD 8, and the tiering SSD 9. The I/O interface 54 is a disk interface compliant with the Serial Advanced Technology Attachment (SATA), Small Computer System Interface (SCSI), Serial Attached SCSI (SAS), or Fibre Channel (FC) standard, for example.

The media reader 55 is a drive for a reading a recording medium 56, such as CD-ROMs and DVD-ROMs, and is a CD-ROM or DVD-ROM drive, for example.

The CPU 51 runs the OS 4.

The OS 4 is system software that implements basic functions, such as hardware managements for the information processing apparatus 2. The OS 4 is Linux®, for example.

The OS 4 includes a tiering driver 5, a cache driver 6, disk drivers 31 to 33, the blktrace command 41, and the iostat command 42.

The disk driver 31 is a device driver that controls the hardware of the HDD 7.

The disk driver 32 is a device driver that controls the hardware of the cache SSD 8.

The disk driver 33 is a device driver that controls the hardware of the tiering SSD 9.

The cache driver 6 is also referred to as a flush cache driver, and controls the disk driver 31 and the disk driver 32 for embodying the cache system of the flush cache 10 defined by the HDD 7 and the cache SSD 8.

The tiering driver 5 controls data migration (transfer) between the flush cache 10 defined by the HDD 7 and the cache SSD 8, and the tiering SSD 9, in a unit of segments, as will be described later.

As depicted in FIG. 1, the tiering driver 5 includes an IO mapper 21 and a tiering table 22.

The IO mapper 21 instructs data migration (transfer) in a unit of segments, to the cache driver 6 and the disk driver 33 by looking up the tiering table 22, which will be described later.

The tiering table 22 is a table describing the relationship between the flush cache (HDD) 10 and the tiering SSD 9.

FIG. 3 is a diagram illustrating an example of a tiering table 22 used in the tiered storage system 1 as one example of an embodiment.

In the example depicted in FIG. 3, the tiering table 22 stores SSD offsets 221, and related offsets 222 in the HDD 10 and statuses 223.

Each SSD offset 221 indicates the location of a segment data, data in which has been migrated to the tiering SSD 9, as the offset for that segment in the tiering SSD 9. For example, the offset may be a logical block address (LBA) of that segment in the tiering SSD 9.

Each HDD offset 222 indicates the original location of a segment in the flush cache 10, data, data in which has been migrated to the tiering SSD 9 indicated by the SSD offset 221, as the offset for that segment in the flush cache 10. For example, the offset may be a logical block address (LBA) of that segment in the flush cache 10. Here, the flush cache 10 is reckoned as a single HDD 10, and an offset in the flush cache 10 is referred to as an "offset in the HDD 10".

Each status 223 stores information indicating the status of a segment data of which has been migrated to the tiering SSD 9, indicated by the SSD offset 221. The status 223 takes one of the following values: "Free" indicating that the tiering SSD 9 has free space; "Allocated" indicating that an area is allocated for the tiering SSD 9 but data is not migrated yet; and "Moving" indicating that data has been migrated between the HDD 10 and the tiering SSD 9. The "Moving" has two values: "Moving (HDD→SSD)" indicating that the data has been migrated from the HDD 10 to the tiering SSD 9, and "Moving (SSD→HDD)" indicating that the data has been migrated vise versa.

The blktrace command 41 depicted in FIGS. 1 and 2 is used to trace the block IO layer. The blktrace command 41 traces the statuses of an IO request in the entry and exit of a block IO layer, and inside the block IO layer. The product of the trace is an IO trace.

The data collector 11, which will be described later, executes the blktrace command periodically (e.g., at one minute interval), and accumulates an IO trace in a load database 15.

For example, on the Linux OS, the data collector 11 measures, for each fixed-size section in the storage volume (hereinafter, such a section will be referred as a segment), the following: 1) the IO count; 2) the ratio per IO size; 3) the ratio of read/write; and 4) the histogram of responses, and stores the results in the load database 15.

The iostat command 42 is used to obtain IO statistics information, and the option "-x" provides information, including the busy ratio for each disk (% util, % util of near 100 indicates that the disk is approaching its performance limit).

% util indicates that ratio of the current performance of a disk to the peak performance.

The CPU 51 (refer to FIG. 2) in the tiered storage controller 1 functions as a tiering manager (tiered storage controller) 3, by executing a program (not illustrated).

The tiering manager 3 identifies segments hit by nomadic work load spike(s), i.e., segments where work loads have relatively longer duration time (e.g., three minutes or longer), in the flush cache 10 defined by the HDD 7 and the cache SSD 8, in real time. The tiering manager 3 then instructs migration of the identified segments (more precisely, data stored in those segments) from the HDD 10 to the tiering SSD 9.

The tiering manager 3 includes a data collector (collector) 11, a work load analyzer (analyzer) 12, and a migrator 14.

The data collector 11 executes the blktrace command 41 periodically in a predetermined interval to collect statistics of each segment, such as IO counts, in real time, and stores the collected statistics in the load database (load information) 15.

As an example, the flush cache 10 has a 4.4-tera byte (TB) capacity, the segment size is 1 GB, and the predetermined interval (time slice) is one minute. In this case, the data collector 11 collects IO counts for 4400 segments every minute, and stores the results in the load database 15.

Note that particular operations by the data collector 11 will be described later with reference to FIG. 5.

The work load analyzer 12 identifies segments hit by nomadic work load spike(s), based on data in the load database 15 collected by the data collector 11.

Here, the work load analyzer 12 detects work loads that have relatively longer duration time, as nomadic work load spikes. The work load analyzer 12 uses average life expectancies of work loads, as their duration time, for identifying nomadic work load spikes. As used herein, the term "average life expectancy" is a duration time of a work load minus the lapse time of that work load.

Specifically, a system administrator may collect duration time of nomadic work load spikes (work loads) in the tiered storage system 1 in advance, and the duration time of the nomadic work load spikes is calculated from the collected duration time using a known calculation technique. Note that techniques for calculating average life expectancies are well known and the description therefor will be omitted.

Figure 14:
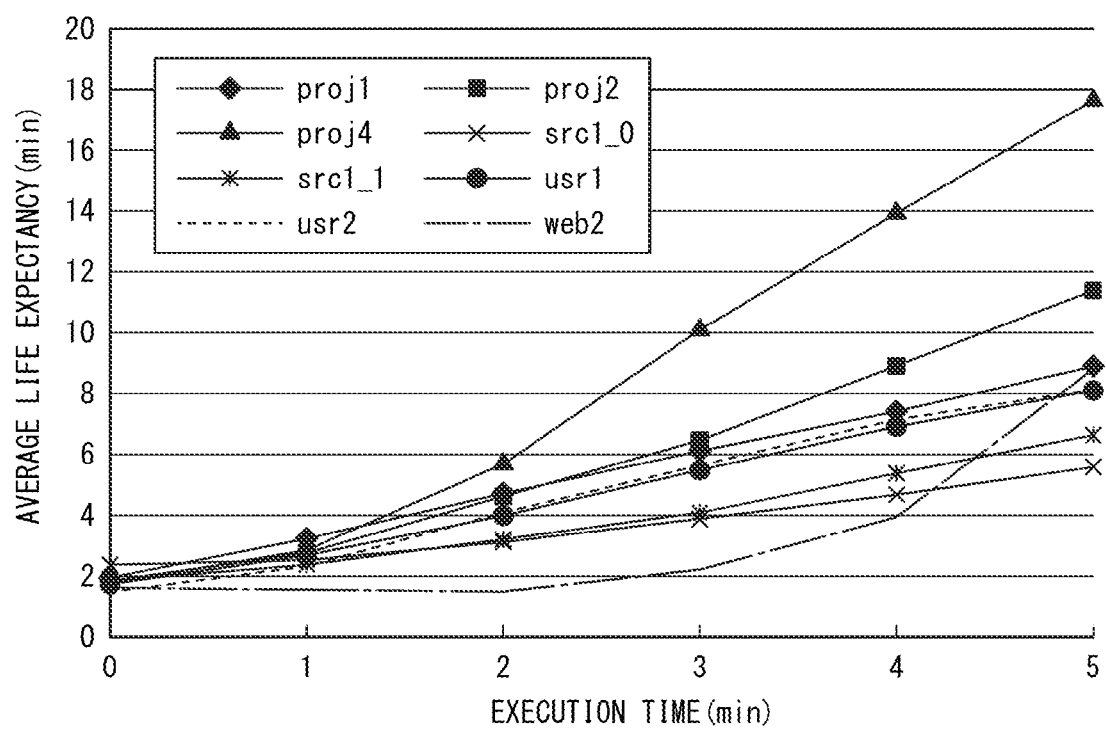
FIG. 14 is a graph illustrating an example of average life expectancies of work loads.

Referring to FIG. 14, an example of average life expectancies will be described.

FIG. 14 is a graph illustrating an example of average life expectancies of work loads.

In this figure, the average life expectancies of eight work loads (proj1, proj2, . . . ) are calculated.

The horizontal axis represents the execution time (duration time) of each work load, while the vertical axis represents the life expectancy of the work load at the execution time.

For example, in the case of proj4, FIG. 14 indicates that the work load may last ten minutes when the work load continues for three minutes.

In this manner, the work load analyzer 12 identifies such a work load as a nomadic load spike, and speculatively migrates the nomadic work load spike to the tiering SSD 9, based on the average life expectancy of each work load.

In the example of proj4 in FIG. 14, if a nomadic work load spike lasting for three minutes is identified, it is expected that this nomadic work load spike may last for another 10 minutes.

The work load analyzer 12 compares the 10 minutes against the cost (time) for tiered migration (staging) of that nomadic work load spike (i.e., the sum of detection overhead and the stating time), and executes a tiered migration if the 10 minutes are more costly.

In other words, in response to detecting a nomadic work load spike that last for a certain time (e.g., three minutes), as indicated by Formula (3) described later, the work load analyzer 12 determines the cost (time) for a tiered migration based on the segment count, and compares that cost (time) against the average life expectancy depicted in FIG. 14.

When the work load analyzer 12 determines that the average life expectancy exceeds the cost (time) for a tiered migration, the work load analyzer 12 selects that segment hit by that nomadic work load spike as a candidate segment (hereinafter, such a segment is referred to as a migration candidate segment or tiered migration candidate segment). The work load analyzer 12 then writes details of the candidate segment to be migrated, into a migration table 13.

Figure 4:
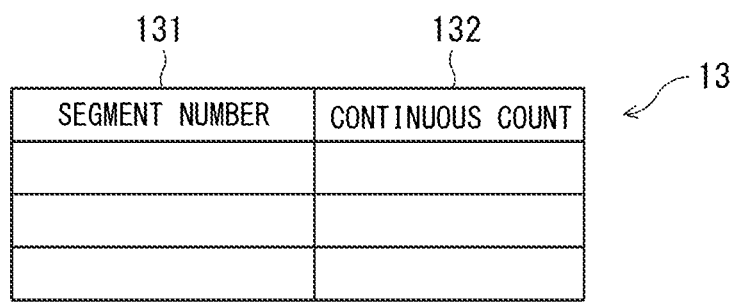
FIG. 4 is a diagram illustrating an example of a tiering table used in the tiered storage system as one example of an embodiment.

Here, an example of the migration table 13 is depicted in FIG. 4. The migration table 13 includes segment numbers 131 and continuous counts 132, as depicted in FIG. 4.

Each segment number 131 indicates a number of a segment which is determined to be migrated to the tiering SSD 9.

Each continuous count 132 indicates how many times the segment has been determined continuously that segment is hit by a nomadic work load spike.

If the count that the segment which has been staged the tiering SSD 9 is not determined continuously that that segment is hit by a nomadic work load spike is less than a certain time out value, the work load analyzer 12 instructs a writeback of that segment from the tiering SSD 9 to the flush cache 10.

The detailed operations of the work load analyzer 12 will be described with reference to FIGS. 6 and 7.

The migrator 14 instructs the tiering driver 5 to migrate a segment from the tiering SSD 9 to the flush cache 10, or vise versa, based on an instruction from the work load analyzer 12.

The detailed operations of the migrator 14 will be described with reference to FIG. 8.

Note that, in the embodiment set forth above, the CPU 51 in the information processing apparatus 2 functions as the tiering manager 3, the data collector 11, the work load analyzer 12, and the migrator 14 in FIGS. 1 and 2, by executing a storage control program.

Note that the program (storage control program) for implementing the functions as the tiering manager 3, the data collector 11, the work load analyzer 12, and the migrator 14 are provided in the form of programs recorded on a computer read able recording medium, such as, for example, a flexible disk, a CD (e.g., CD-ROM, CD-R, CD-RW), a DVD (e.g., DVD-ROM, DVD-RAM, DVD-R, DVD+R, DVD-RW, DVD+RW, HD-DVD), a Blu Ray disk, a magnetic disk, an optical disk, a magneto-optical disk, or the like. The computer then reads a program from that storage medium 56 and uses that program after transferring it to the internal storage apparatus or external storage apparatus or the like. Alternatively, the program may be recoded on a storage unit (storage medium 56), for example, a magnetic disk, an optical disk, a magneto-optical disk, or the like, and the program may be provided from the storage unit to the computer through a communication path.

Upon embodying the functions as the tiering manager 3, the data collector 11, the work load analyzer 12, and the migrator 14, programs stored in internal storage apparatuses (the memory 25 in the information processing apparatus 2) are executed by a microprocessor of the computer (the CPU 51 in the information processing apparatus 2 in this embodiment). In this case, the computer may alternatively read a program stored in the storage medium 56 via the media reader 55 for executing it.

Note that, in this embodiment, the term "computer" may be a concept including hardware and an operating system, and may refer to hardware that operates under the control of the operating system, for example. Alternatively, when an application program alone can make the hardware to be operated without requiring an operating system, the hardware itself may represent a computer. The hardware includes at least a microprocessor, e.g., CPU, and a means for reading a computer program recorded on a storage medium 56 and, in this embodiment, the information processing apparatus 2 includes a function as a computer.

(B) Functions and Operations

Hereinafter, the functions and the operations of the tiering storage system 1 as an example of an embodiment will be described with reference to the drawings.

Now referring to FIG. 5, operations by the data collector 11 will be described.

Figure 5:
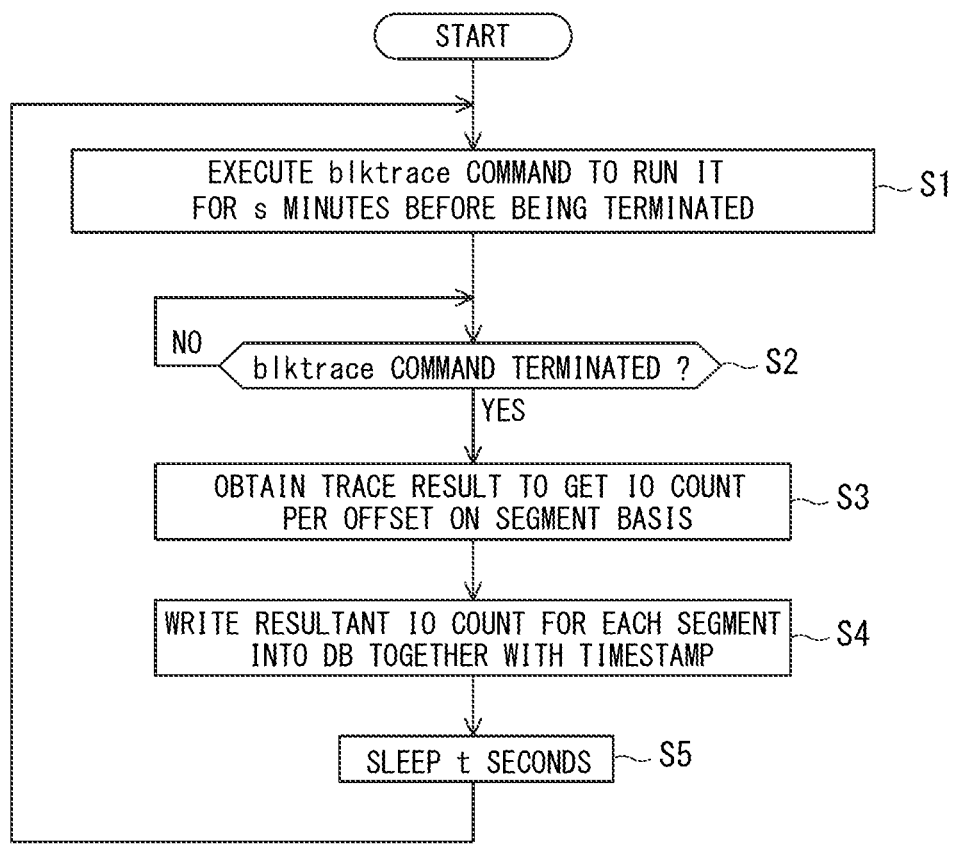
FIG. 5 is a flow chart illustrating a data collection by a data collector in the tiered storage system as an example of an embodiment.

FIG. 5 is a flow chart (Steps S 1 to S 5) illustrating a data collection by the data collector 11 in the tiered storage system 1 as an example of an embodiment.

In Step S 1, the data collector 11 initiates the blktrace command 41, specifying the condition in that the blktrace command 41 is executed for "s" seconds (e.g., 60 seconds).

Then in Step S 2, the data collector 11 determines whether "s" seconds elapses and the blktrace command 41 is terminated.

If the blktrace command 41 is not terminated (refer to the NO route from Step S 2), the flow returns to Step S 2.

Otherwise, if the blktrace command 41 is terminated (refer to the YES route from Step S 2), in Step S 3, the data collector 11 checks the trace result obtained through the blktrace command 41 and determines the IO count for each offset in a unit of fixed-size segment (e.g., in a unit of 1-GB segment).

Then in Step S 4, the data collector 11 writes the IO counts determined in Step S 3 into the load database 15, together with the current time stamp.

Finally in Step S 5, after sleeping for "t" seconds (e.g., 60 seconds), the data collector 11 returns to Step S 1.

Next, referring to FIGS. 6 and 7, operations by the work load analyzer 12 and the migrator 14 will be described.

Figure 6:
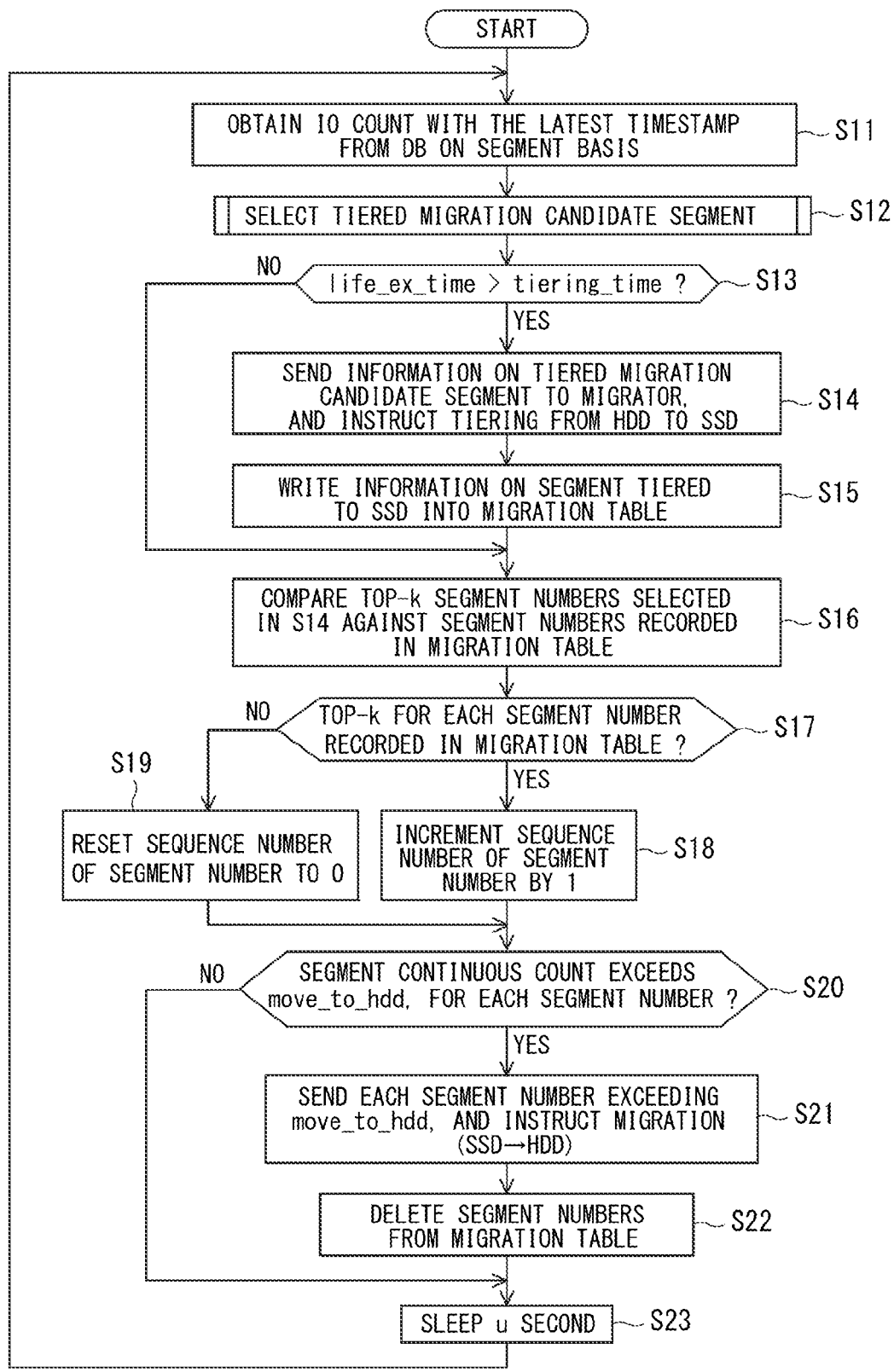
FIG. 6 is a flow chart summering a migration by a work load analyzer and a migrator in the tiered storage system as an example of an embodiment.

FIG. 6 is a flow chart (Steps S 11 to S 23) summering a migration by the work load analyzer 12 and the migrator 14 in the tiered storage system 1 as an example of an embodiment. FIG. 7 is a flow chart (Steps S 121 to S 131) illustrating an extraction of a migration candidate segment by the work load analyzer 12 depicted in FIG. 6.

Firstly in Step S 11 in FIG. 6, the work load analyzer 12 obtains the IO counts with the latest time stamp for each segment from the load database 15.

Next, in Step S 12, the work load analyzer 12 identifies tiered migration candidate segment(s). How the segment is obtained will now be described with reference made to FIG. 7.

Figure 7:
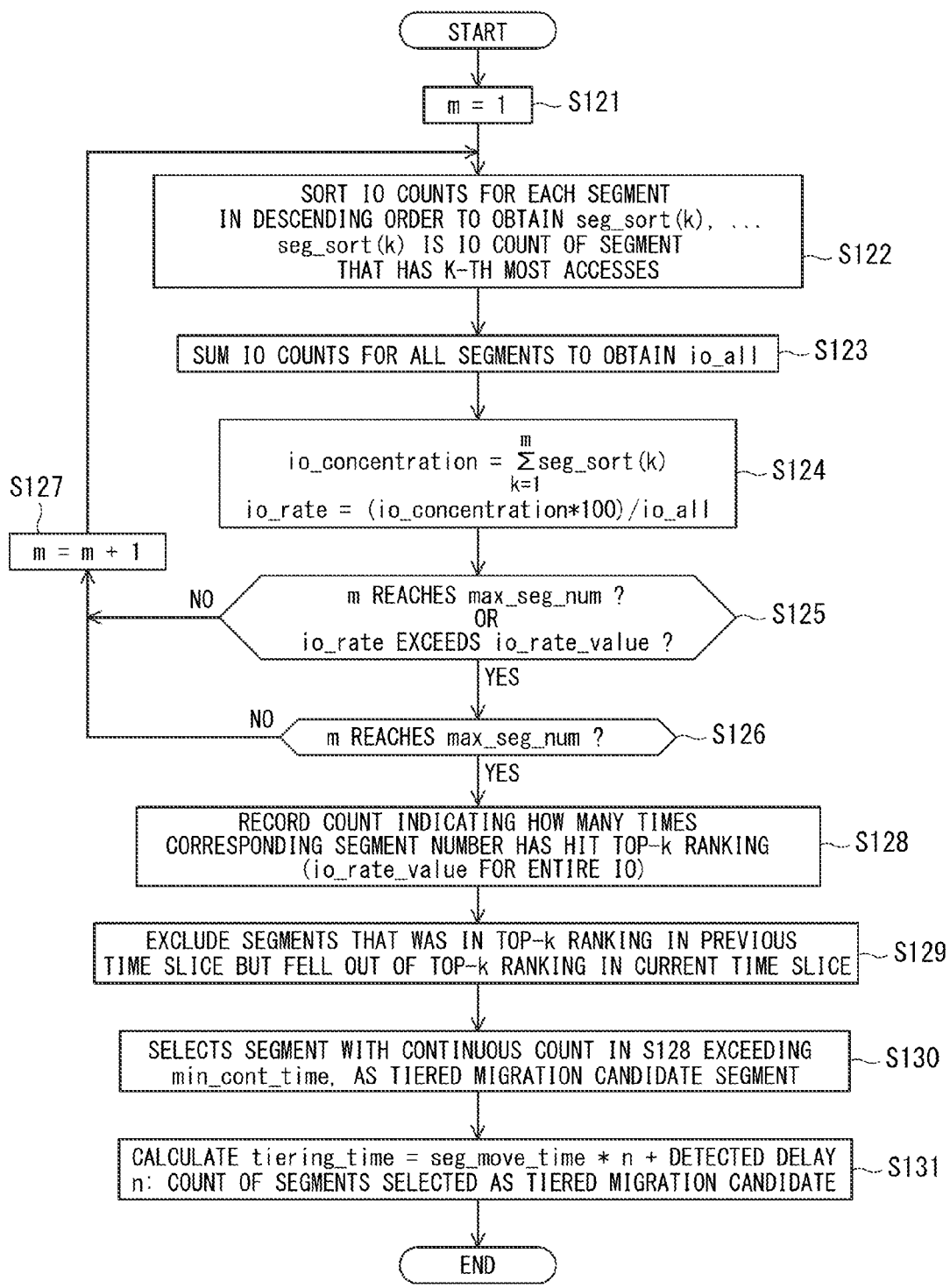
FIG. 7 is a flow chart illustrating an extraction of a migration candidate segment by the work load analyzer depicted in FIG. 6.

Firstly, in Step S 121 in FIG. 7, the work load analyzer 12 sets a variable m to its initial value of 1. The variable m is used to determine the count of segments which reaches the threshold 10 rate for determining as a spike (io_rate_value).

Next, in Step S 122, the work load analyzer 12 sorts the IO counts for each segment obtained in Step S 11 in FIG. 6 in the descending order to obtain an array seg_sort (1), seg_sort (2), . . . , seg_sort (k), . . . . Here, seg_sort (k) is the IO count of the segment that has the k-th most accesses.

Next, in Step S 123, the work load analyzer 12 sums the IO counts for all segments to obtain io_all. Specifically, io_all is the total IO count at the time slice in interest.

Next, in Step S 124, the work load analyzer 12 executes calculations for seg_sort (1), seg_sort (2), . . . , seg_sort (k), . . . , using the following Eqs. (1) and (2):

$$\text{io\_concentration} = \sum_{k=1}^{m} \text{seg\_sort}(k) \quad (1)$$

$$\text{io\_rate} = (\text{io\_concentration} \times 100)/\text{io\_all} \quad (2)$$

In Step S 125, the work load analyzer 12 determines whether m reaches the maximum segment count allowed for simultaneous tiering (max_seg_num), or whether io_rate exceeds the IO rate threshold for determining as a spike (io_rate_value).

If m reaches max_seg_num, or io_rate exceeds io_rate_value (refer to the YES route from Step S 125), in Step S 126, the work load analyzer 12 determines whether m reaches max_seg_num.

If m reaches max_seg_num (refer to the YES route from Step S 126), in Step S 128, the work load analyzer 12 records the count indicating how many times the corresponding segment number has hit the top-k ranking (io_rate_value for the entire IOs (%)).

Next, in Step S 129, the work load analyzer 12 excludes segments that was in the top-k ranking in the previous time slice but fell out of the top-k ranking in the current time slice.

In Step S 130, the work load analyzer 12 selects the segments of which continuous counts determined in Step S 128 exceeds min_cont_time, as tiered migration candidate segments. Here, min_cont_time is a threshold for selecting tiered migration candidate segments, and when a spike in a segment lasts exceeding this threshold, the segment is selected as a tiering migration candidate segment.

In Step S 131, the work load analyzer 12 calculates tiering_time for n segments selected as tiering migration candidates as follows:

$$\text{tiering\_time} = \text{seg\_move\_time} * n + \text{detected delay} \quad (3)$$

In the above Eq. (3), seg_move_time is the value (in seconds) representing the cost (time) of migrating a single segment from the HDD 10 to the tiering SSD 9, and is 10 seconds, for example. The detected delay is a delay time (in seconds) for migrating a segment.

If m does not reach max_seg_num and io_rate does not exceed io_rate_value (refer to the NO routes from Step S 125 and S 126), in Step S 127, m is incremented by one (+1). Thereafter, the flow returns to Step S 122.

Referring back to FIG. 6, in Step S 13, the work load analyzer 12 determines whether the average life expectancy of the spike (life_ex_time) exceeds tiering_time. Here, the value of life_ex_time varies for each work load, and is determined and set in the information processing apparatus 2 in advance, by a system administrator, for example.

If life_ex_time exceeds tiering_time (refer to the YES route from Step S 13), in Step S 14, the work load analyzer 12 instructs the migrator 14 to migrate data in the tiered migration candidate segments, from the HDD 10 to the tiering SSD 9. In response, the migrator 14 migrates data in the instructed tiered migration candidate segments from the HDD 10 to the tiering SSD 9.

Then in Step S 15, the work load analyzer 12 records information about the segments migrated to the tiering SSD 9, into the migration table 13 in the work load analyzer 12.

Otherwise, if life_ex_time does not exceed tiering_time in Step S 13 (refer to the NO route from Step S 13), the flow moves to Step S 16.

Next, in Step S 16, the work load analyzer 12 compares the segment numbers of the segments ranked within top k in Step S 12 against segment numbers recorded in the migration table 13.

Next, in Step S 17, the work load analyzer 12 determines whether, for each segment number recorded in the migration table 13, that segment is in the top-k ranking.

If the segment is in the top-k ranking (refer to the YES route from Step S 17), in Step S 18, the work load analyzer 12 increments the segment continuous count for that segment by one.

Otherwise, if the segment is not in the top-k ranking (refer to the NO route from Step S 17), in Step S 19, the work load analyzer 12 resets the segment continuous count to '0'.

Next, in Step S 20, the work load analyzer 12 determines whether the segment continuous count exceeds move_to_hdd, for each segment number recorded in the migration table 13. Note that move_to_hdd is a threshold for selecting a segment for moving back from the tiering SSD 9 to the HDD 10, and a segment is determined to be moved back if that segment is out of the top-k ranking.

If the segment continuous count exceeds move_to_hdd (refer to the YES route from Step S 20), in Step S 21, the work load analyzer 12 instructs the migrator 14 to migrate each segment number exceeding move_to_hdd, from the tiering SSD 9 to the HDD 7.

Then in Step S 22, the work load analyzer 12 deletes the segment numbers from the migration table 13.

Otherwise, if the segment continuous count does not exceed move_to_hdd (refer to the NO route from Step S 20), the flow returns to Step S 23.

Next in Step S 23, after sleeping u seconds (e.g., 60 seconds), the work load analyzer 12 returns to Step S 11.

The thresholds used in the flows in FIGS. 6 and 7 (e.g., max_seg_num, io_rate_value, min_cont_time, seg_move_time, life_ex_time, move_to_hdd) are set in the information processing apparatus 2 in advance, for example. The values may be factory set, or may be set by a user. The thresholds may also be varied by the user later.

Figure 8:
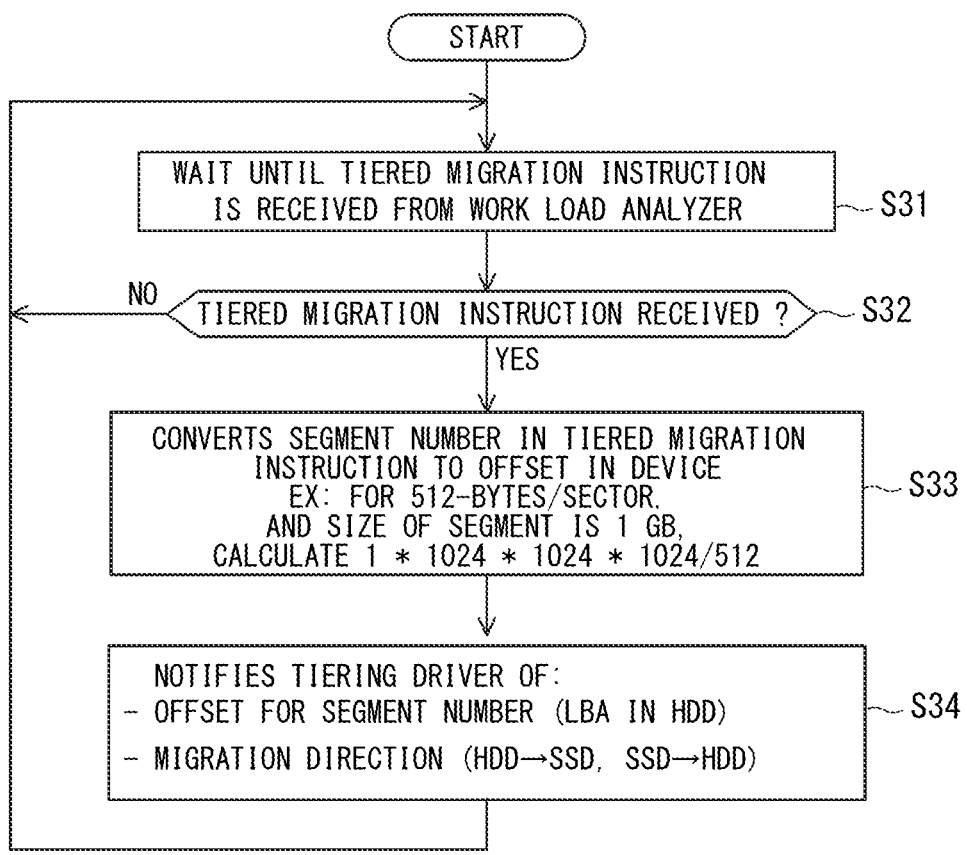
FIG. 8 is a flow chart illustrating a migration of a segment by the migrator in the tiered storage system as an example of an embodiment.

Next, referring to FIG. 8, a migration by the migrator 14 is described.

FIG. 8 is a flow chart (Steps S 31 to S 34) illustrating a migration of a segment by the migrator 14 in the tiered storage system 1 as an example of an embodiment.

In Step S 31, the migrator 14 waits until a tiered migration instruction is received from the work load analyzer 12.

In Step S 32, the migrator 14 determines whether a tiered migration instruction is received from the work load analyzer 12.

If a tiered migration instruction is received (refer to the YES route from Step S 32), in Step S 33, the migrator 14 converts the segment number specified the tiered migration instruction received from the work load analyzer 12, to an offset in the HDD 10 (LBA).

For example, for a 512-bytes/sector, the size of a single segment is 1 GB, the migrator 14 calculates the offset by 1*1024*1024*1024/512.

Next, in Step S 34, the migrator 14 notifies the tiering driver 5 of the offset related to the (LBA in the HDD 10) and the migration direction (from the HDD 10 to the tiering SSD 9, or from the tiering SSD 9 to the HDD 10). In response, the tiering driver 5 migrates the segment based on the information. The flow then returns to Step S 31.

If no tiered migration instruction has been received in Step S32 (refer to the NO route from Step S 32), the migrator 14 returns to Step S 31 where it waits until a tiered migration instruction is received.

Next, referring to FIG. 9, a migration of a segment by the tiering driver 5 will be described.

Figure 9:
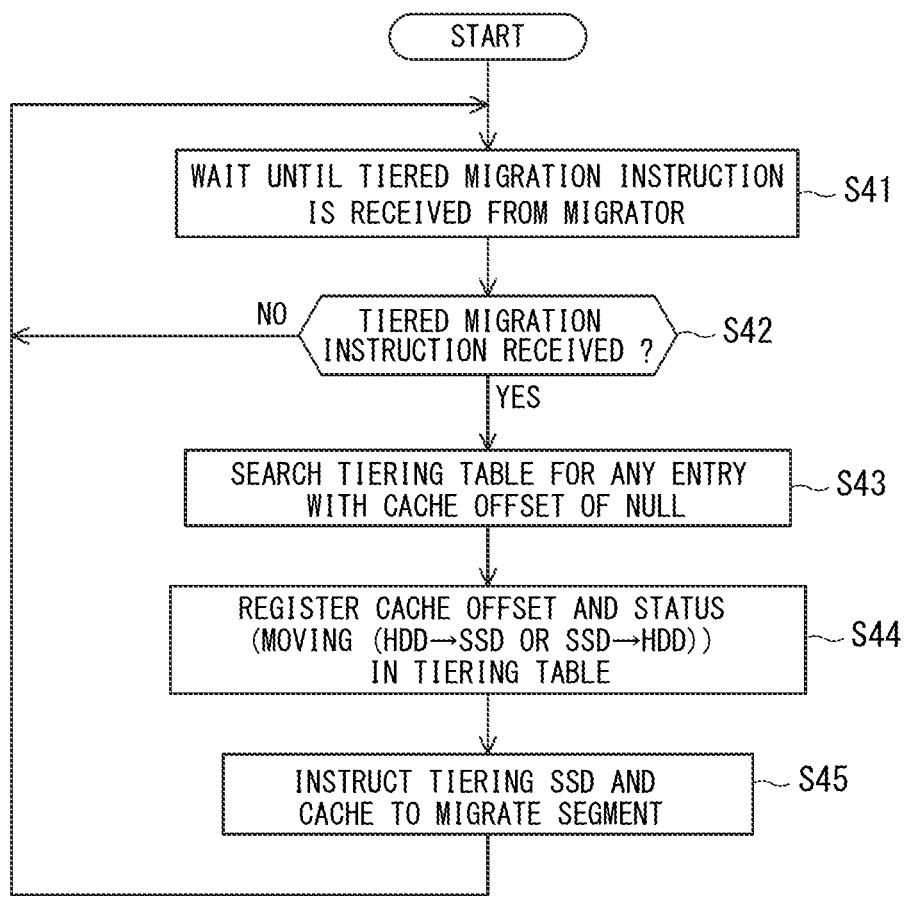
FIG. 9 is a flow chart illustrating processing by a tiering driver in the tiered storage system as an example of an embodiment, after the segment is migrated.

FIG. 9 is a flow chart (Steps S 41 to S 45) illustrating a migration of a segment by the tiering driver 5 in the tiered storage system 41 as an example of an embodiment.

In Step S 41, the tiering driver 5 waits until a tiered migration instruction is received from the migrator 14.

In Step S 42, the tiering driver 5 determines whether a tiered migration instruction is received from the migrator 4.

If a tiered migration instruction is received (refer to the YES route from Step S 42), in Step S 43, the tiering driver 5 searches the tiering table 22 for any entry with a HDD offset 222 of NULL.

Next, in Step S 44, the tiering driver 5 registers, in the found NULL entry, the HDD offset 222 information and status (Moving (HDD→SSD or SSD→HDD)), in the tiering table 22.

Finally in Step S 45, the tiering driver 5 instructs the tiering SSD 9 and the cache 10 to migrate the segment. Specifically, the IO mapper 21 in the tiering driver 5 instructs the cache driver 6 and the disk driver 33 to migrate the segment. The flow then returns to Step S 41.

Otherwise, if no tiered migration instruction has been received in Step S 42 (refer to the NO route from Step S 42), the tiering driver 5 returns to Step S 41 where it waits until a tiered migration instruction is received.

Next, processing by the tiering driver 5 after a segment is migrated will be described.

Figure 10:
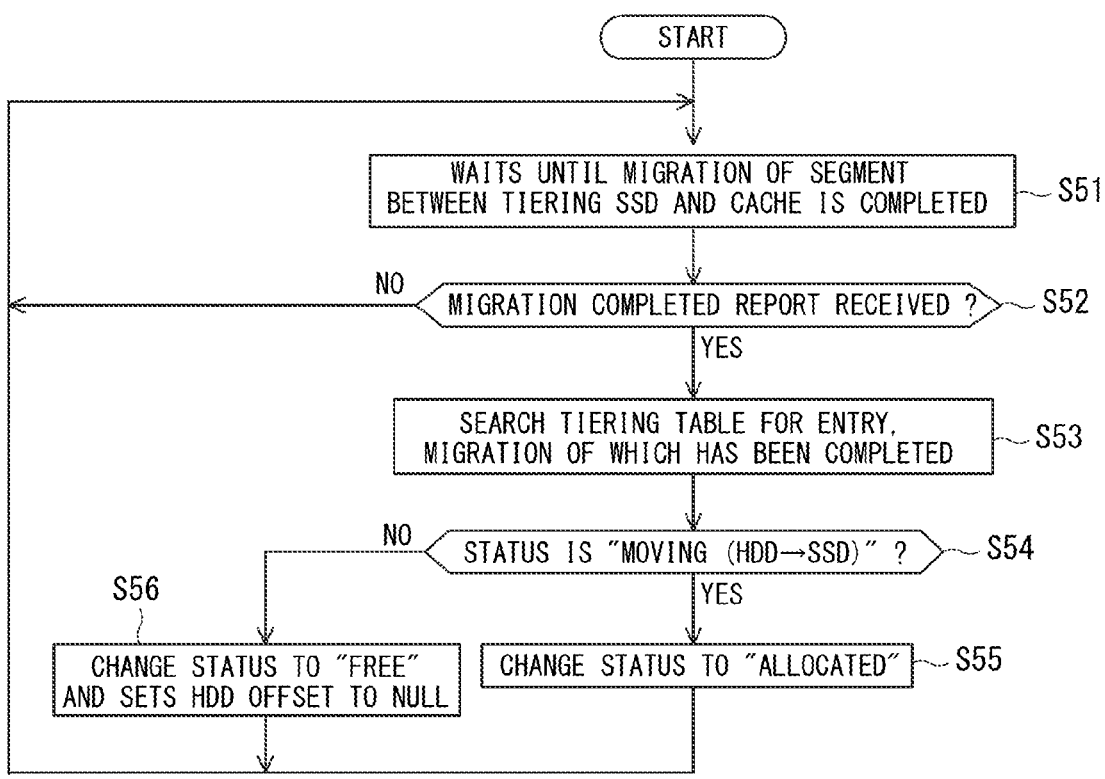
FIG. 10 is a flow chart illustrating a migration of a segment by the tiering driver in the tiered storage system as an example of an embodiment.

FIG. 10 is a flow chart (Steps S 51 to S 56) illustrating processing by a tiering driver in the tiered storage system as an example of an embodiment, after the segment is migrated;

In Step S 51, the tiering driver 5 waits until a migration of a segment between the tiering SSD 9 and the cache 10 is completed.

In Step S 52, the tiering driver 5 determines whether a migration completed report is received.

If a migration completed report is received (refer to the YES route from Step S 52), in Step S 53, the tiering driver 5 searches the tiering table 22 for any entry, the migration of which has been completed.

Next, in Step S 54, the tiering driver 5 determines whether the status of the found entry (if any) is "Moving (HDD→SSD)".

If the status is "Moving (HDD→SSD)" (refer to the YES route from Step S 54), in Step S 55, the tiering driver 5 changes the status of that entry to "Allocated". The flow then returns to Step S 51.

Otherwise, if the status is not "Moving (HDD→SSD)" (refer to the NO route from Step S 54), in Step S 56, the tiering driver 5 changes the status of that entry to "Free" and sets a value of NULL to the corresponding HDD offset 222. The flow returns to Step S 51.

Otherwise, if no migration completed report has been received in Step S52 (refer to the NO route from Steps S52), the tiering driver 5 returns to Step S 51 where it waits until a migration completed report is received.

Next, processing of a user IO by the tiering driver 5 after a segment is migrated will be described.

Figure 11:
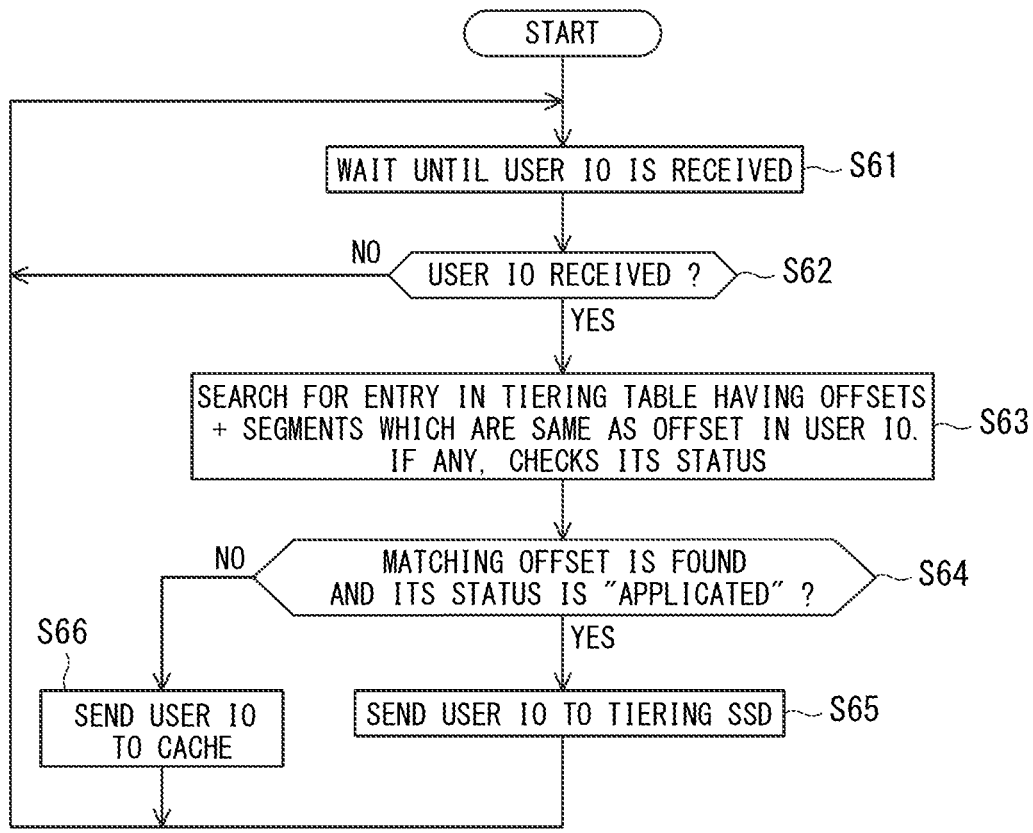
FIG. 11 is a flow chart illustrating processing of a user IO by the tiering driver in the tiered storage system as an example of an embodiment.

FIG. 11 is a flow chart (Steps S 61 to S 66) illustrating processing of an user IP by a tiering driver in the tiered storage system as an example of an embodiment, after the segment is migrated;

In Step S 61, the tiering driver 5 waits until a user IO is received. The user IO specifies the offset in the HDD 7 and size of data requested in the user IO, the type of the requested IO (read or write), and the like.

In Step S 62, the tiering driver 5 determines whether a user IO is received.

If a user IO is received (refer to the YES route from Step S 62), in Step S 63, the tiering driver 5 checks all entries in the tiering table 22. Specifically, the tiering driver 5 checks whether there is any entry in the tiering table 22 having offsets 221 and 222 and a segments which are the same as the offset and segment size specified in the user IO. If any, the tiering driver 5 then checks whether the status 223 of that entry is "Allocated".

If a matched entry is found and the status 223 of that entry is "Allocated" (refer to the YES route from Step S 64), the data requested in the user IO is in the tiering SSD 9. Thus, in Step S 65, the tiering driver 5 sends the user IO to tiering SSD 9. Specifically, the IO mapper 21 in the tiering driver 5 instructs the disk driver 33 to handle the user IO. Thereafter, the flow returns to Step S 61.

Otherwise, if no match is found, or if an entry is found but its status 223 is not "Allocated" (refer to the NO route from Step S 64), the data requested in the user IO is in the cached storage (HDD) 10. Therefore, in Step S 66, the tiering driver 5 sends the user IO to the cached storage 10. Specifically, the IO mapper 21 in the tiering driver 5 instructs the cache driver 6 to handle the user IO. The flow returns to Step S 61.

Otherwise, if no user IO has been received in Step S62 (refer to the NO route from Step S 62), the tiering driver 5 returns to Step S 61 where it waits until a user IO is received.

(C) Advantageous Effects

In accordance with the technique in the present disclosure, in the tiered storage system 1, the cost (time) for migrating a nomadic work load spike to the SSD 9 exceeds its duration, that nomadic work load spike is dynamically migrated to the SSD 9.

Here, in the tiered storage system 1, since the SSD 9 and the HDD 7 forms a tiered storage, no writeback of a dirty block occurs for freeing a block in the SSD 9. In other words, once data is staged to the SSD 9, no writeback load is generated. As a result, even if a nomadic work load spike emerges, the SSD 9 can be employed efficiently.

Experiments by the present inventors have revealed that the information processing apparatus 2 can operate 17% faster than a tiered storage controller including only a flush cache 1.

Figure 12:
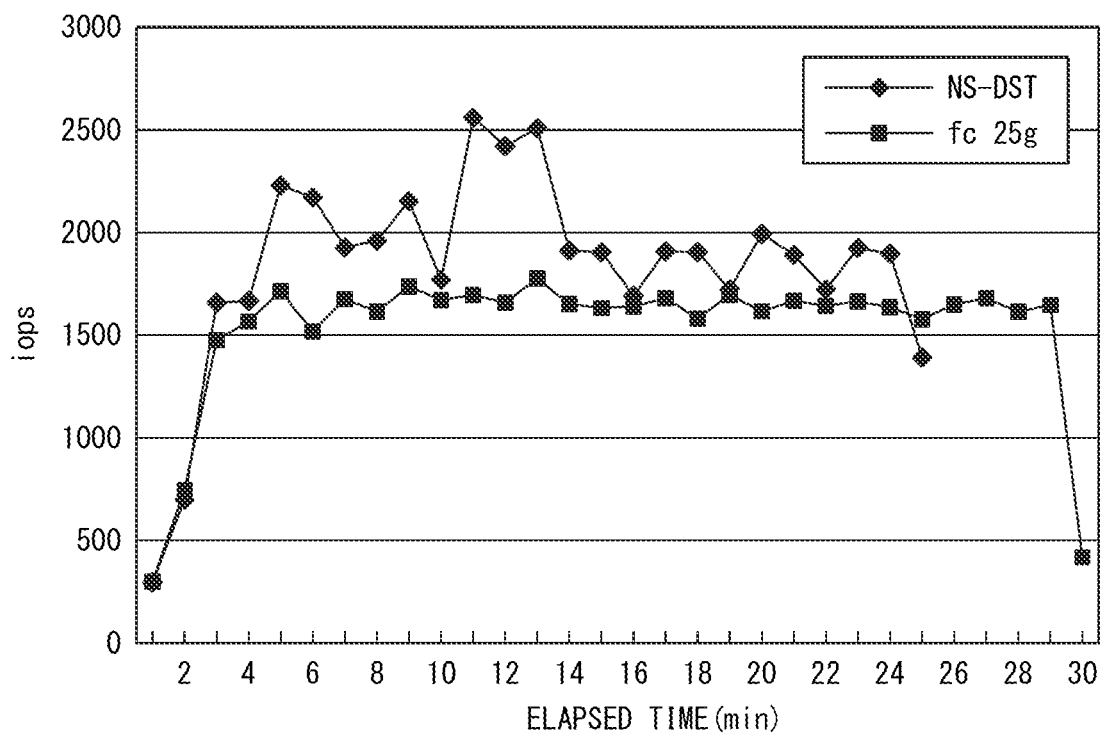
FIG. 12 is a graph comparing the tiered storage system as an example of an embodiment against a conventional tiered storage system.
Figure 13:
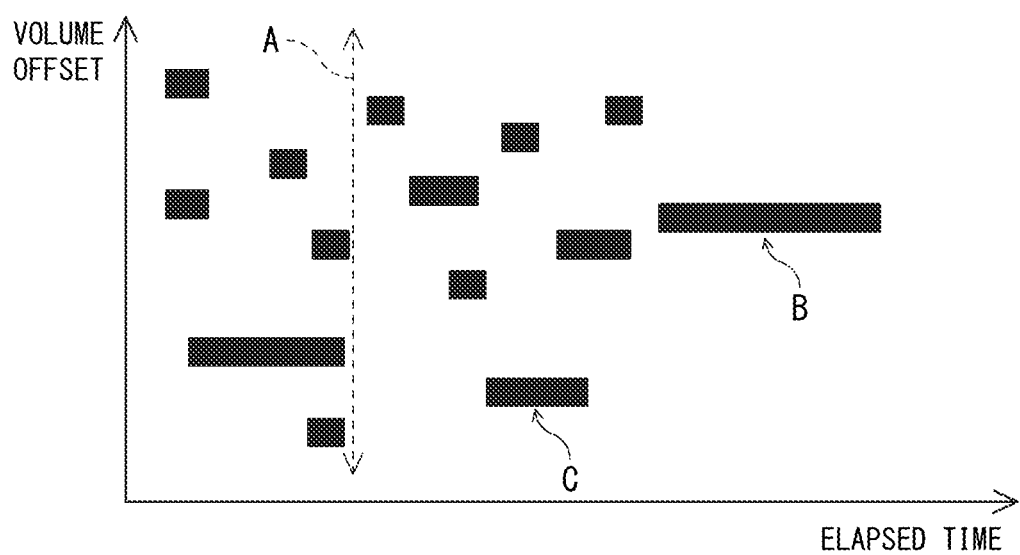
FIG. 13 is a graph illustrating an example of nomadic work load spikes.

FIG. 12 compares the tiered storage system 1 as an example of an embodiment against a conventional tiered storage system.

The graph indicates results of the same benchmark of the tiered storage system 1 (indicated by "NS-DST"), and a system including only a Facebook flush cache (indicated by "fc 25 g"). The sizes of the SSDs in the two systems were 25 GB for comparison.

In FIG. 12, the horizontal axis represents the elapse time after the benchmark was started, while the vertical axis represents the IO count per second (iops).

The data indicates that peak loads were greater and the benchmark completed earlier in the tiered storage system 1.

As described above, in the tiered storage system 1, since no writeback of a dirty block occurs for freeing a block in the SSD 9, nomadic work load spikes can be handled more efficiently.

(D) Miscellaneous

Note that the present disclosure is not restricted to the embodiments described above, and various modifications may be made without departing from the spirit of the present disclosure.

For example, although volumes are divided into 1-GB segments in an example of an embodiment described above, the size of divided segments may be suitably modified.

Further, a first storage unit has been described as a HDD, and a second storage unit faster than the first storage unit has been described as an SSD. However, the storage units may be any types of storage units, as long as the second storage unit can operate faster than the first storage unit.

Further, although the OS 54 running on the information processing apparatuses 2 is Linux in an example of an embodiment described above, other UNIX® operating systems or other OSs in different architecture may also be used. If a different OS is used, corresponding commands of that OS are used. For example, if the OS 54 is Windows® Operating System, the IO count can be collected using a corresponding Windows command.

It is noted that the configurations and operations of the tiering storage system 1 which have been described may be omitted or may be combined as appropriate if necessary. In other words, the components and functions described above may be appropriately selected or combined together such that the functions of the disclosed technique are achieved.

Further, in an example of an embodiment described above, the order of the steps in the flows may be modified.

Further, the steps in flowcharts described above may be combined in the tiering storage system 1.

In accordance with the present disclosure, in a storage system, nomadic work load spikes can be handled more efficiently.

All examples and conditional language provided herein are intended for pedagogical purposes to aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiment(s) of the present invention have been described in detail, it should be understood that the various changes, substitutions, and alterations could be made hereto without departing from the spirit and scope of the invention.

What is claimed is:

1. A storage controller that controls a first storage unit and a second storage unit that has an access speed higher than an access speed of the first storage unit, the storage controller comprising:
   a collector that collects load information about respective loads in a plurality of areas in the first storage unit;
   a selector that selects a candidate area in the first storage unit which is to be migrated, based on the load information collected by the collector; and
   a migrator that migrates data in the selected candidate area, to the second storage unit,
   wherein the selector selects the candidate area based on an average life expectancy, the average life expectancy being calculated by subtracting an actual elapse time of a load during which that load has lasted, in each of the plurality of areas in the first storage unit, from an expected duration time of that load during which that load is expected to last.

2. The storage controller according to claim 1, wherein the collector collects a count of input/output requests per unit time as the load information.

3. The storage controller according to claim 1, wherein the selector selects, as the candidate area, an area among the plurality of areas in the first storage unit, the area being where the average life expectancy exceeds a time for migrating the load from the first storage unit to the second storage unit.

4. A storage system comprising:
   a first storage unit;
   a second storage unit that has an access speed higher than an access speed of the first storage unit; and
   a storage controller that collects load information about respective loads in a plurality of areas in the first storage unit, selects a candidate area in the first storage unit which is to be migrated, based on the collected load information, and migrates data in the selected candidate area, to the second storage unit,
   wherein the storage controller selects the candidate area based on an average life expectancy, the average life expectancy being calculated by subtracting an actual elapse time of a load during which that load has lasted, in each of the plurality of areas in the first storage unit, from an expected duration time of that load during which that load is expected to last.

5. The storage system according to claim 4, wherein the storage controller collects a count of input/output requests per unit time as the load information.

6. The storage system according to claim 4, wherein the storage controller selects, as the candidate area, an area among the plurality of areas in the first storage unit, the area being where the average life expectancy exceeds a time for migrating the load from the first storage unit to the second storage unit.

7. The storage system according to claim 4, further comprising a third storage unit that has an access speed higher than the access speed of the first storage unit,
   wherein the third storage unit is controlled by a driver that also controls the first storage unit.

8. A method of controlling a storage controller that controls a first storage unit and a second storage unit that has an access speed higher than an access speed of the first storage unit, the method comprising, by the storage controller:
   collecting load information about respective loads in a plurality of areas in the first storage unit;
   selecting a candidate area in the first storage unit which is to be migrated, based on the collected load information; and
   migrating data in the selected candidate area, to the second storage unit,
   wherein the selecting comprises selecting the candidate area based on an average life expectancy, the average life expectancy being calculated by subtracting an actual elapse time of a load during which that load has lasted, in each of the plurality of areas in the first storage unit, from an expected duration time of that load during which that load is expected to last.

9. The method according to claim 8, wherein the load information is a count of input/output requests per unit time.

10. The method according to claim 8, wherein the selecting comprises selecting, as the candidate area, an area among the plurality of areas in the first storage unit, the area being where the average life expectancy exceeds a time for migrating the load from the first storage unit to the second storage unit.

11. A computer readable recording medium having stored therein, a control program for controlling a storage controller that controls a first storage unit and a second storage unit that has an access speed higher than an access speed of the first storage unit, the control program causing the storage controller to:
- collect load information about respective loads in a plurality of areas in the first storage unit;
- select a candidate area in the first storage unit which is to be migrated, based on the collected load information; and
- migrate data in the selected candidate area, to the second storage unit,
- wherein the selecting comprises selecting the candidate area based on an average life expectancy, the average life expectancy being calculated by subtracting an actual elapse time of a load during which that load has lasted, in each of the plurality of areas in the first storage unit, from an expected duration time of that load during which that load is expected to last.

12. The computer readable recording medium according to claim 11, wherein the load information is a count of input/output requests per unit time.

13. The computer readable recording medium according to claim 11, wherein the selecting comprises selecting, as the candidate area, an area among the plurality of areas in the first storage unit, the area being where the average life expectancy exceeds a time for migrating the load from the first storage unit to the second storage unit.

* * * * *